(12) United States Patent
Chen et al.

(10) Patent No.: US 12,438,946 B2
(45) Date of Patent: Oct. 7, 2025

(54) METHOD FOR STORING AND TRANSMITTING DATA BY USING VEHICLE KEY AND APPARATUS

(71) Applicant: Shenzhen Yinwang Intelligent Technologies Co., Ltd., Shenzhen (CN)

(72) Inventors: Zheng Chen, Shanghai (CN); Linchuan Guo, Nanjing (CN); Bing Bai, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 164 days.

(21) Appl. No.: 17/687,377

(22) Filed: Mar. 4, 2022

(65) Prior Publication Data

US 2022/0188095 A1    Jun. 16, 2022

Related U.S. Application Data

(63) Continuation of application No. PCT/CN2020/096016, filed on Jun. 15, 2020.

(30) Foreign Application Priority Data

Sep. 5, 2019    (CN) .......................... 201910837712.1

(51) Int. Cl.
| | | |
|---|---|---|
| *H04L 67/12* | (2022.01) | |
| *B60R 16/023* | (2006.01) | |
| *G06F 8/65* | (2018.01) | |
| *H04L 67/1097* | (2022.01) | |

(52) U.S. Cl.
CPC .......... *H04L 67/12* (2013.01); *B60R 16/0231* (2013.01); *G06F 8/65* (2013.01); *H04L 67/1097* (2013.01)

(58) Field of Classification Search
CPC .......... G06F 8/65; G06F 9/4451; G06F 16/23; G06F 3/067; G06F 16/162; B60R 16/0231
See application file for complete search history.

(56) References Cited

U.S. PATENT DOCUMENTS

| | | |
|---|---|---|
| 10,493,955 B1 | 12/2019 | Chen |
| 2007/0083725 A1 | 4/2007 | Kasiolas et al. |

(Continued)

FOREIGN PATENT DOCUMENTS

| | | |
|---|---|---|
| CN | 103035054 A | 4/2013 |
| CN | 203755819 U | 8/2014 |

(Continued)

OTHER PUBLICATIONS

Gao; Translated CN 106741341A; 9 pages (Year: 2017).*

(Continued)

*Primary Examiner* — S. Sough
*Assistant Examiner* — Cuong V Luu
(74) *Attorney, Agent, or Firm* — Leydig, Voit & Mayer, Ltd.

(57) ABSTRACT

A method for storing and transmitting data by using a vehicle key includes: the vehicle key receives and stores first data from an intelligent vehicle, where the first data is non-real-time processing data from the intelligent vehicle; and the vehicle key sends the first data to cloud. In this way, while data transmission costs of the intelligent vehicle are reduced, user experience of the intelligent vehicle is improved.

7 Claims, 6 Drawing Sheets

(56) References Cited

U.S. PATENT DOCUMENTS

| | | | |
|---|---|---|---|
| 2014/0304326 A1* | 10/2014 | Wesley | H04L 67/1095 |
| | | | 709/203 |
| 2015/0134226 A1 | 5/2015 | Palmer et al. | |
| 2016/0099927 A1 | 4/2016 | Oz et al. | |
| 2016/0189539 A1 | 6/2016 | Lin et al. | |
| 2018/0261019 A1* | 9/2018 | Yang | H04L 65/4025 |
| 2019/0193677 A1* | 6/2019 | Suzuki | H04L 67/52 |
| 2020/0233654 A1* | 7/2020 | Matsumoto | H04W 4/44 |

FOREIGN PATENT DOCUMENTS

| | | | |
|---|---|---|---|
| CN | 106301781 A | | 1/2017 |
| CN | 106355862 A | | 1/2017 |
| CN | 106741341 A | * | 5/2017 |
| CN | 107689098 A | | 2/2018 |
| CN | 107728520 A | | 2/2018 |
| CN | 108667844 A | | 10/2018 |
| CN | 109195136 A | | 1/2019 |
| CN | 110148239 A | | 8/2019 |
| EP | 3432233 A1 | | 1/2019 |
| IN | 106274796 A | | 1/2017 |
| KR | 20190096315 A | | 8/2019 |

OTHER PUBLICATIONS

Shenzhen; translated CN 106355862A (Year: 2017).*
Qi Yu; Research and Protection of Security Technology for Intelligent Connected Vehicle Keys; IEEE; pp. 646-651; retrieved on Apr. 8, 2025 (Year: 2024).*

* cited by examiner

METHOD FOR STORING AND TRANSMITTING DATA BY USING VEHICLE KEY AND APPARATUS

CROSS-REFERENCE TO RELATED APPLICATIONS

This application is a continuation of International Application No. PCT/CN2020/096016, filed on Jun. 15, 2020, which claims priority to Chinese Patent Application No. 201910837712.1, filed on Sep. 5, 2019. The disclosures of the aforementioned applications are hereby incorporated by reference in their entireties.

TECHNICAL FIELD

This application relates to the field of vehicle electronic technologies, and specifically, to a method for storing and transmitting data by using a vehicle key and an apparatus.

BACKGROUND

As vehicles become more intelligent, data generated every day by intelligent vehicles is increasing. According to statistics, an intelligent vehicle generates about 30 GB of data a day, while a driverless vehicle may generate up to 4,000 GB of data a day. A large amount of data generated by the intelligent vehicle conflicts with today's high data charges. Based on data currently generated by the intelligent vehicle, it is estimated that a data charge is high, which is hard for both an intelligent vehicle enterprise and an intelligent vehicle owner to afford. As a result, it is difficult to effectively use and monetize intelligent vehicle data. However, not all data generated by the intelligent vehicle needs to be processed in real time. Some data related to autonomous driving or data subject to national and local supervision needs to be transmitted to cloud in real time for processing, for example, location data, speed data, and vehicle fault alarm data. Some other data related to data analysis and operation requirements does not need to be processed on the cloud in real time. For example, driving behavior analysis data and component analysis data can be processed in batches, and upgrade package data used to upgrade a vehicle system and knowledge base update data also do not need to be transmitted to the intelligent vehicle in real time from the cloud.

In the current technology, the intelligent vehicle data is processed mainly by disposing an in-vehicle computer system in the vehicle to store data and perform data communication with an external device, for example, cloud. In the current technology, the in-vehicle computer system accesses a cellular network of a telecom operator for communication (for example, a 4G network or a 5G network) by using a built-in SIM card. In an environment without Wi-Fi, a large amount of mobile data is consumed and high costs are incurred. In the current technology, some vehicle keys capable of storing data can store only simple vehicle status information (for example, fuel consumption, mileages, vehicle model numbers, vehicle body numbers, and tire pressure values). The vehicle keys support only one-way transmission of data from vehicles to the vehicle keys and then to cloud via a personal computer (PC) but do not support downloading of data from the cloud and transmission of the data to the vehicle. The vehicle keys need Universal Serial Bus (USB) connection to implement data transmission and viewing, and cannot automatically transmit the data. Therefore, an existing method for transmitting vehicle data and an existing vehicle key cannot be applied to increasingly intelligent vehicle application scenarios in the future.

Therefore, in today's increasingly intelligent vehicle application scenarios, it is necessary to give a vehicle key a more intelligent function in addition to a conventional function of opening and closing vehicle doors, to help resolve an increasingly severe problem of data transmission of an intelligent vehicle.

SUMMARY

In view of the foregoing problems in the current technology, an objective of this application is to provide a method for storing and transmitting data by using a vehicle key and an apparatus, so that the vehicle key can be used as a data transit device between an intelligent vehicle and cloud to store complex process data in addition to having a simple conventional function of opening and closing vehicle doors. When the vehicle key accesses an authenticated Wi-Fi environment, the vehicle key automatically uploads data without manual intervention. The vehicle key can conveniently, economically, and securely transmit non-real-time processing data generated by the intelligent vehicle to the cloud for processing in batches at different times, or transmit a large data packet from the cloud to the intelligent vehicle in batches. In this way, while data transmission costs of an intelligent vehicle user are reduced, user experience of the intelligent vehicle user can be improved.

Convenience features are as follows. As a data transit device, the vehicle key is easy to carry. In addition, after finishing initial setup, the user does not need to perform any manual operation in a process in which the user uploads data from the intelligent vehicle to the cloud by using the vehicle key, and downloads data required by the intelligent vehicle from the cloud to the vehicle key. After the user starts the intelligent vehicle by using the vehicle key, data is synchronized between the intelligent vehicle key and the intelligent vehicle in a process of using the vehicle. After the user gets out of the vehicle and gets home, the data is automatically uploaded and downloaded between the intelligent vehicle key and the cloud, without even being sensed by the user.

An economy feature is as follows. It is assumed that data that is uploaded and downloaded when the intelligent vehicle communicates with the cloud is classified into two types: about 20% real-time processing data and about 80% non-real-time processing data. The real-time processing data is still uploaded and downloaded through a cellular network by using mobile data, and the non-real-time processing data is first stored in the vehicle key, and then uploaded to the cloud or downloaded from the cloud to the vehicle in a low-cost wireless mode, a low-cost wired mode, or another low-cost short-distance communication mode. In this way, data charges can be reduced by 80%.

A security feature is that identity authentication is required for data exchange between any two parties in the cloud, the vehicle key, and the intelligent vehicle, which can effectively prevent unauthorized access.

According to a first aspect of this application, a method for storing and transmitting data by using a vehicle key is provided, including: The vehicle key receives and stores first data from an intelligent vehicle, where the first data is non-real-time processing data from the intelligent vehicle; and the vehicle key sends the first data to cloud. The method can save data charges incurred when the first data needs to be transmitted in real time in the current technology.

According to the first aspect, in a first possible implementation of the first aspect, the vehicle key receives and stores second data from the cloud, where the second data is non-real-time processing data from the cloud; and the vehicle key sends the second data to the intelligent vehicle. The method can save data charges incurred when the second data needs to be transmitted in real time in the current technology.

According to the first aspect or the first possible implementation of the first aspect, in a second possible implementation of the first aspect, the first data includes big data analysis data or operation data, and the second data includes system upgrade data.

According to the first aspect or the first to the second possible implementations of the first aspect, in a third possible implementation of the first aspect, the big data analysis data includes driving behavior analysis data or component life analysis data; the operation data includes user profile data, interest and preference data, or human machine interface interaction record data; and the system upgrade data includes vehicle upgrade package data or knowledge base update data.

According to the first aspect or the first to the third possible implementations of the first aspect, in a fourth possible implementation of the first aspect, the vehicle key receives the first data from the intelligent vehicle, or sends the second data to the intelligent vehicle through wireless transmission, wired transmission, or short-distance transmission; and the vehicle key receives the second data from the cloud, or sends the first data to the cloud through wireless transmission or a wired transmission transit personal computer (PC).

According to the first aspect or the first to the fourth possible implementations of the first aspect, in a fifth possible implementation of the first aspect, the wireless transmission includes wireless fidelity (Wi-Fi) transmission, Bluetooth transmission, or infrared transmission, the wired transmission includes USB cable transmission or RJ45 network cable transmission, and the short-distance transmission includes near field communication (NFC). Data transmission can be conveniently performed by using this method.

According to the first aspect or the first to the fifth possible implementations of the first aspect, in a sixth possible implementation of the first aspect, when the vehicle key is in a working state, the vehicle key receives and stores the first data, or sends the second data to the intelligent vehicle, where the working state is that the vehicle key is connected to the intelligent vehicle; and when the vehicle key is in a non-working state, the vehicle key receives and stores the second data, or sends the first data to the cloud, where the non-working state is that the vehicle key is connected to the cloud.

According to the first aspect or the first to the sixth possible implementations of the first aspect, in a seventh possible implementation of the first aspect, after the vehicle key receives first data reception confirmation from the intelligent vehicle, or after the vehicle key receives second data reception confirmation from the cloud, the vehicle key clears the stored sent data.

According to the first aspect or the first to the seventh possible implementations of the first aspect, in an eighth possible implementation of the first aspect, before the first data is received, identity authentication is performed between the vehicle key and the intelligent vehicle and the authentication succeeds; before the first data is sent, identity authentication is performed between the vehicle key and the cloud and the authentication succeeds; before the second data is received, identity authentication is performed between the vehicle key and the cloud and the authentication succeeds; and before the second data is sent, identity authentication is performed between the vehicle key and the intelligent vehicle and the authentication succeeds.

According to the first aspect or the first to the eighth possible implementations of the first aspect, in a ninth possible implementation of the first aspect, the identity authentication includes a manner of using a secure sockets layer (SSL) bidirectional certificate for authentication or a manner of using a username and a password. The method can ensure security of data exchange between any two parties of the cloud, the vehicle key, and the intelligent vehicle.

According to a second aspect of this application, an intelligent vehicle data management apparatus is provided, including:

a communications module, configured to send first data to a vehicle key, or receive second data from the vehicle key, where the first data is non-real-time processing data from an intelligent vehicle, and the second data is non-real-time processing data from cloud, where the non-real-time processing data from the intelligent vehicle refers to data that does not need to be exchanged by the intelligent vehicle with the cloud in real time, and the non-real-time processing data from the cloud refers to data that does not need to be exchanged by the cloud with the intelligent vehicle in real time.

a storage module, configured to store the received second data from the vehicle key; and a processing module, configured to classify data generated by the intelligent vehicle into real-time processing data and non-real-time processing data. The method can save data charges incurred when the first data and the second data need to be transmitted in real time in the current technology.

According to the second aspect, in a first possible implementation of the second aspect, the first data includes big data analysis data or operation data, and the second data includes system upgrade data.

According to the second aspect or the first possible implementation of the second aspect, in a second possible implementation of the second aspect, the big data analysis data includes driving behavior analysis data or component life analysis data; the operation data includes user profile data, interest and preference data, or human machine interface interaction record data; and the system upgrade data includes vehicle upgrade package data or knowledge base update data.

According to the second aspect or the first to the second possible implementations of the second aspect, in a third possible implementation of the second aspect, the intelligent vehicle data management apparatus receives the second data from the vehicle key or sends the first data from the intelligent vehicle to the vehicle key through wireless transmission, wired transmission, or short-distance transmission.

According to the second aspect or the first to the third possible implementations of the second aspect, in a fourth possible implementation of the second aspect, the wireless transmission includes Wi-Fi transmission, Bluetooth transmission, or infrared transmission, the wired transmission includes USB cable transmission or RJ45 network cable transmission, and the short-distance transmission includes NFC. Data transmission can be conveniently performed by using this method.

According to the second aspect or the first to the fourth possible implementations of the second aspect, in a fifth possible implementation of the second aspect, the processing module is further configured to separately perform identity authentication with the vehicle key and the cloud, and establish a connection after the identity authentication succeeds.

According to the second aspect or the first to the fifth possible implementations of the second aspect, in a sixth possible implementation of the second aspect, the identity authentication includes a manner of using a SSL bidirectional certificate for authentication or a manner of using a username and a password. The method can ensure security of data exchange between any two parties of the cloud, the vehicle key, and the intelligent vehicle.

According to a third aspect of this application, a vehicle key is provided, including:
- a communications module, configured to receive first data from an intelligent vehicle, receive second data from cloud, send the second data to the intelligent vehicle, or send the first data to the cloud, where the first data is non-real-time processing data from the intelligent vehicle, and the second data is non-real-time processing data from the cloud; and
- a storage module, configured to store the received first data from the intelligent vehicle or store the received second data from the cloud. The method can save data charges incurred when the first data and the second data need to be transmitted in real time in the current technology.

According to the third aspect, in a first possible implementation of the third aspect, the first data includes big data analysis data or operation data, and the second data includes system upgrade data.

According to the third aspect or the first possible implementation of the third aspect, in a second possible implementation of the third aspect, the big data analysis data includes driving behavior analysis data or component life analysis data; the operation data includes user profile data, interest and preference data, or human machine interface interaction record data; and the system upgrade data includes vehicle upgrade package data or knowledge base update data.

According to the third aspect or the first to the second possible implementations of the third aspect, in a third possible implementation of the third aspect, the vehicle key receives the first data from the intelligent vehicle, or sends the second data to the intelligent vehicle through wireless transmission, wired transmission, or short-distance transmission; and the vehicle key receives the second data from the cloud, or sends the first data to the cloud through wireless transmission or a wired transmission transit personal computer (PC).

According to the third aspect or the first to the third possible implementations of the third aspect, in a fourth possible implementation of the third aspect, the wireless transmission includes Wi-Fi transmission, Bluetooth transmission, or infrared transmission, the wired transmission includes USB cable transmission or RJ45 network cable transmission, and the short-distance transmission includes NFC. Data transmission can be conveniently performed by using this method.

According to the third aspect or the first to the fourth possible implementations of the third aspect, in a fifth possible implementation of the third aspect, the vehicle key further includes a processing module, where the processing module is configured to determine that when the vehicle key is in a working state, the vehicle key receives and stores the first data, or sends the second data to the intelligent vehicle, where the working state is that the vehicle key is connected to the intelligent vehicle; and
the processing module is further configured to determine that when the vehicle key is in a non-working state, the vehicle key receives and stores the second data, or sends the first data to the cloud, where the non-working state is that the vehicle key is connected to the cloud.

According to the third aspect or the first to the fifth possible implementations of the third aspect, in a sixth possible implementation of the third aspect, the processing module is further configured to, after reception of the data sent by the vehicle key to the intelligent vehicle is confirmed, or after reception of the data sent by the vehicle key to the cloud is confirmed, clear the sent data stored in the storage module.

According to the third aspect or the first to the sixth possible implementations of the third aspect, in a seventh possible implementation of the third aspect, the processing module is further configured to separately perform identity authentication with the intelligent vehicle and the cloud, and establish a connection after the identity authentication succeeds.

According to the third aspect or the first to the seventh possible implementations of the third aspect, in an eighth possible implementation of the third aspect, the identity authentication includes a manner of using a SSLbidirectional certificate for authentication or a manner of using a username and a password. The method can ensure security of data exchange between any two parties of the cloud, the vehicle key, and the intelligent vehicle.

According to a fourth aspect of this application, an intelligent vehicle is provided, where the intelligent vehicle includes the intelligent vehicle data management apparatus according to the second aspect and the vehicle key according to the third aspect.

According to a fifth aspect of this application, a cloud data management apparatus is provided, including:
- a communications module, configured to receive first data from a vehicle key, or send second data to a vehicle key, where the first data is non-real-time processing data from an intelligent vehicle, and the second data is non-real-time processing data from cloud; and
- a processing module, configured to filter out the second data, and further configured to perform classification and storage, and subsequent processing on the received first data. The method can save data charges incurred when the first data and the second data need to be transmitted in real time in the current technology.

According to the fifth aspect, in a first possible implementation of the fifth aspect, the first data includes big data analysis data or operation data, and the second data includes system upgrade data.

According to the fifth aspect or the first possible implementation of the fifth aspect, in a second possible implementation of the fifth aspect, the big data analysis data includes driving behavior analysis data or component life analysis data; the operation data includes user profile data, interest and preference data, or human machine interface interaction record data; and the system upgrade data includes vehicle upgrade package data or knowledge base update data.

According to the fifth aspect or the first to the second possible implementations of the fifth aspect, in a third possible implementation of the fifth aspect, the cloud data management apparatus receives the first data from the vehicle key, or sends the second data from the cloud to the vehicle key through wireless transmission or a wired transmission transit personal computer (PC).

According to the fifth aspect or the first to the third possible implementations of the fifth aspect, in a fourth possible implementation of the fifth aspect, the wireless transmission includes Wi-Fi transmission, Bluetooth transmission, or infrared transmission, and wired transmission includes USB cable transmission or RJ45 network cable transmission. Data transmission can be conveniently performed by using this method.

According to the fifth aspect or the first to the fourth possible implementations of the fifth aspect, in a fifth possible implementation of the fifth aspect, the processing module is further configured to separately perform identity authentication with the vehicle key and the intelligent vehicle, and establish a connection after the identity authentication succeeds.

According to the fifth aspect or the first to the fifth possible implementations of the fifth aspect, in a sixth possible implementation of the fifth aspect, the identity authentication includes a manner of using a SSL bidirectional certificate for authentication or a manner of using a username and a password. The method can ensure security of data exchange between any two parties of the cloud, the vehicle key, and the intelligent vehicle.

In this application, a large amount of non-real-time processing data is first stored in the vehicle key, and is automatically uploaded to the cloud after a Wi-Fi environment is accessed. Because the vehicle key is used to store or transmit the non-real-time processing data, data charges of the user using Vehicle-to-Everything can be significantly reduced, and user costs are reduced. This has the advantage of economy. The three parties, namely the cloud, the vehicle key, and the intelligent vehicle undergo unified identity authentication. In each step of the data exchange process, all identities need to be authenticated, which can effectively prevent unauthorized access and has the advantage of security. As the data transit device, the vehicle key is easy to carry. In addition, after finishing the initial setup, the user does not need to perform any manual operation in the process in which the user uses the vehicle key to upload the data from the intelligent vehicle to the cloud, or downloads the data required by the intelligent vehicle from the cloud to the vehicle key. After the user starts the intelligent vehicle by using the vehicle key, data is synchronized between the intelligent vehicle key and the vehicle in the process of using the vehicle. After the user gets out of the vehicle and gets home, the data is automatically uploaded and downloaded between the intelligent vehicle key and the cloud without even being sensed by the user, which has the advantage of convenience.

BRIEF DESCRIPTION OF DRAWINGS

The following describes the accompanying drawings used in this application.

DESCRIPTION OF EMBODIMENTS

Figure 1:
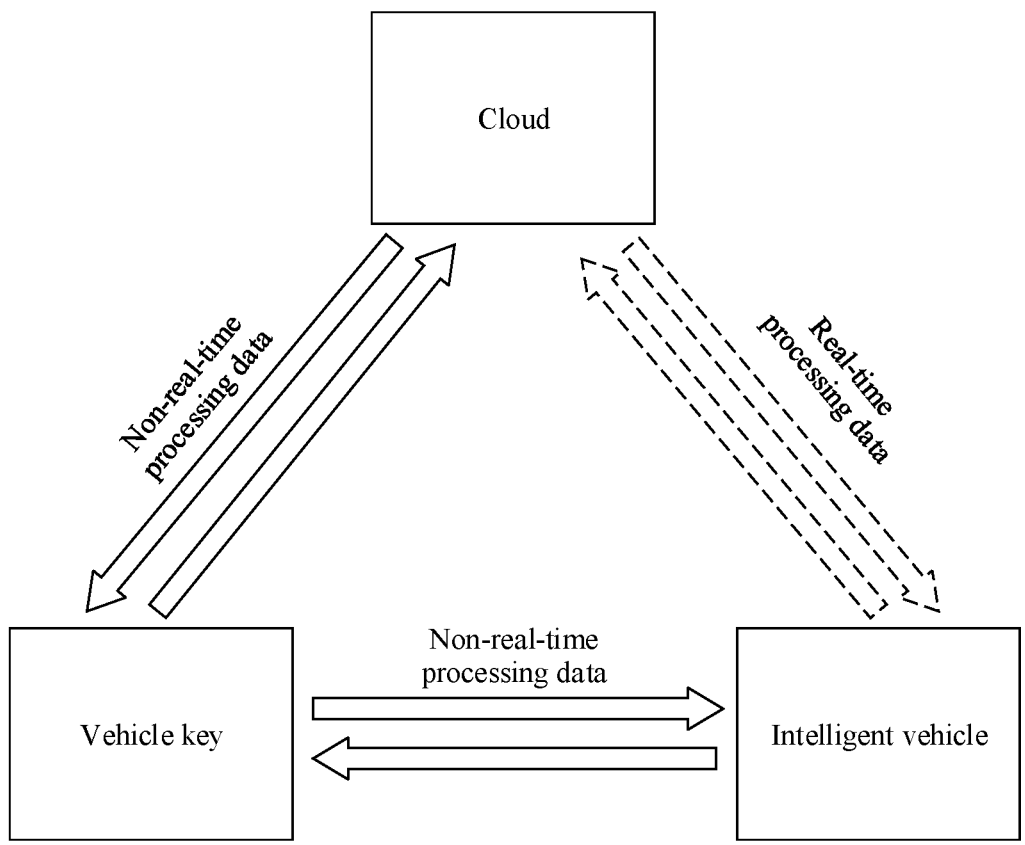
FIG. 1 is a schematic diagram of a three-party data exchange system for an intelligent vehicle, a vehicle key, and cloud according to an embodiment of this application.

This application is applied to an application scenario of an intelligent vehicle data exchange system. As shown in FIG. 1, the system mainly includes three parts, namely cloud, a vehicle key, and an intelligent vehicle. The cloud is mainly used to implement intelligent algorithms, including data decryption, parsing, cleansing, or preprocessing. The cloud can receive, send, and process at a high speed real-time processing data from the intelligent vehicle. The cloud can communicate with the vehicle key to receive non-real-time processing data uploaded by the vehicle key or provide data that needs to be downloaded by the vehicle key. The real-time processing data includes data that needs to be uploaded to the cloud in real time or data that the cloud needs to process in real time and give a feedback on. For example, real-time speed data, intelligent vehicle location data, real-time battery information data (temperature data, current data, voltage data, and the like), and fault alarm data need to be uploaded to national and local supervision platforms in real time and are the data that needs to be uploaded to the cloud in real time. For another example, a user performs speech control in the vehicle to search for music. Speech instruction data is processed by the intelligent vehicle and then uploaded to the cloud. The cloud invokes a content provider (CP) resource or a service provider (SP) resource, and then feeds back the resource to the intelligent vehicle. The speech instruction data is the data that the cloud needs to process in real time and give a feedback on. The non-real-time processing data is transmitted to the cloud by using the vehicle key, and may be, for example, big data analysis data including driving behavior analysis data or component life analysis data, or operation data including user profile data, interest and preference data, or human machine interface interaction record data. Non-real-time processing data stored in the cloud may be sent to the vehicle key, and transmitted to the intelligent vehicle by using the vehicle key, and may be, for example, system upgrade data including vehicle upgrade package data or knowledge base update data. The vehicle key is mainly used to store or transmit data, and may implement bidirectional communication with the cloud and the intelligent vehicle. The intelligent vehicle is used to classify generated data, in which the real-time processing data is directly exchanged with the cloud, and the non-real-time processing data is exchanged with the vehicle key. The intelligent vehicle is further used to receive the real-time processing data transmitted by the cloud and the non-real-time processing data transmitted by the cloud by using the vehicle key.

An application scenario of this application is as follows. When a large amount of non-real-time processing data is exchanged between the intelligent vehicle and the cloud, the intelligent vehicle or the cloud may first transmit the data to the vehicle key, the vehicle key is used as a data transit device, and then the data is transmitted from the vehicle key to the cloud or the intelligent vehicle. In this way, data charges incurred by real-time data exchange may be reduced, and thus data transmission costs are reduced. For example, an upgrade package is downloaded from the cloud to the vehicle key, and is transmitted from the vehicle key to the intelligent vehicle; or human machine interface interaction record data and driving behavior analysis data generated by the intelligent vehicle are first transmitted to the vehicle key and then uploaded by the vehicle key to the cloud. While cellular network data charges are expensive, user experience may still be ensured with low costs.

Figure 2:
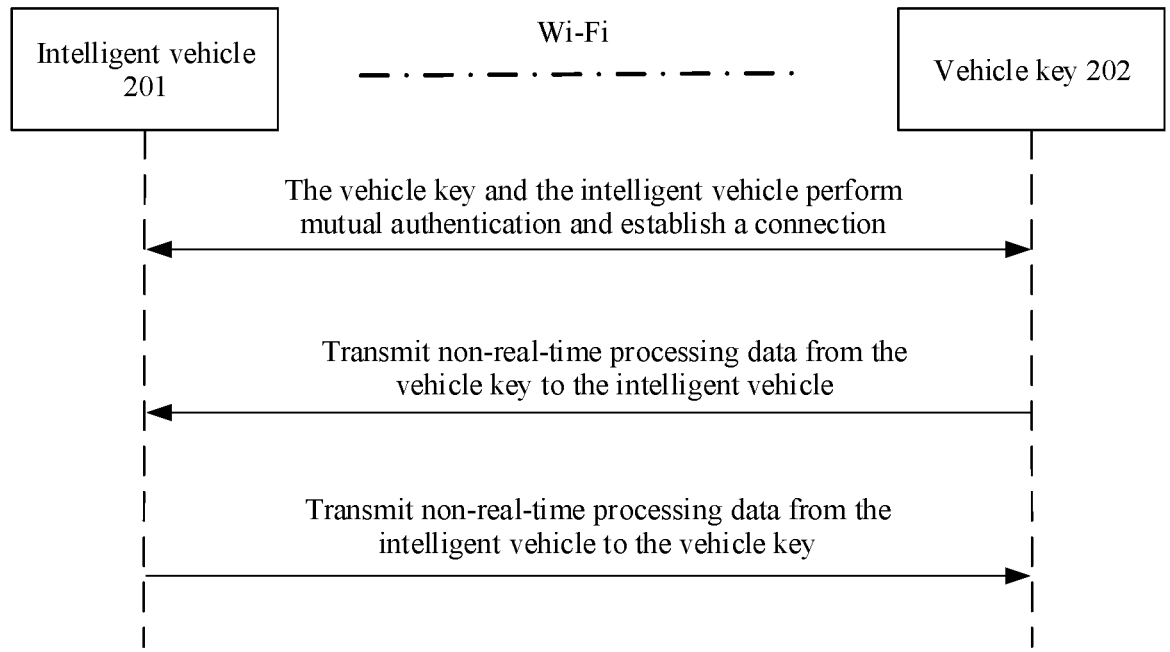
FIG. 2 is a schematic diagram of a method for storing and transmitting data between an intelligent vehicle and a vehicle key by using the vehicle key according to an embodiment of this application.

Embodiment 1 of this application provides a method for storing and transmitting data by using a vehicle key, and is applied to data transmission between the vehicle key and an intelligent vehicle. As shown in FIG. 2, after identity authentication between an intelligent vehicle 201 and a vehicle key 202 succeeds and a connection is established, non-real-time processing data may be transmitted from the vehicle key to the intelligent vehicle, or from the intelligent vehicle to the vehicle key through Wi-Fi.

After a user starts the intelligent vehicle when carrying the vehicle key, the vehicle key establishes the connection to the intelligent vehicle. Optionally, both identities of the vehicle key and the intelligent vehicle need to be authenticated. In this case, the vehicle key is in a working state. Data transmission between the vehicle key and the intelligent vehicle may be wireless transmission, for example, Wi-Fi transmission, Bluetooth transmission, or infrared transmission, may be wired transmission, for example, USB cable transmission or RJ45 network cable transmission, or may be other low-cost short-distance communication data transmission, for example, NFC. A mutual authentication manner may be a manner of using a SSL bidirectional certificate for authentication or a manner of using a username and a password, or may be another common manner or a combination of a plurality of manners.

Data is generated during running of the intelligent vehicle. The data is classified into two types. One type is real-time processing data that needs to be uploaded to cloud in real time, for example, real-time speed data, intelligent vehicle location data, real-time battery information data (temperature data, current data, voltage data, and the like), or fault alarm data. Another type is the non-real-time processing data that does not need to be uploaded to the cloud in real time, for example, big data analysis data including driving behavior analysis data or component life analysis data, or operation data including user profile data, interest and preference data, or human machine interface interaction record data. The real-time processing data that needs to be uploaded to the cloud in real time is directly transmitted by the intelligent vehicle to the cloud through a mobile cellular network, and the non-real-time processing data that does not need to be uploaded to the cloud in real time is transmitted by the intelligent vehicle to the vehicle key.

In a possible implementation, the vehicle key functions as a data transit device. In one aspect, the vehicle key may receive and store non-real-time processing data generated during traveling of the intelligent vehicle, for example, big data analysis data including driving behavior analysis data or component life analysis data, or operation data including user profile data, interest and preference data, or human machine interface interaction record data. In another aspect, the vehicle key may send non-real-time processing data downloaded from the cloud to the intelligent vehicle, for example, system upgrade data including vehicle upgrade package data or knowledge base update data. Optionally, after the vehicle key completes sending the non-real-time processing data that needs to be sent to the intelligent vehicle, reception of the data sent to the intelligent vehicle is confirmed, and the vehicle key receives a reception confirmation feedback from the intelligent vehicle, the vehicle key clears the sent data stored in the vehicle key. A volume of the non-real-time processing data usually is large, but the non-real-time processing data does not need to be exchanged with the intelligent vehicle in real time. If an in-vehicle computer system of the intelligent vehicle that consumes mobile data is used to download the data during traveling, high costs are incurred. However, using the vehicle key as the transit device can save costs.

In another possible implementation, in one aspect, the intelligent vehicle may automatically receive and store non-real-time processing data downloaded from the cloud in the vehicle key, for example, system upgrade data including vehicle upgrade package data or knowledge base update data. In another aspect, the intelligent vehicle may send non-real-time processing data generated during traveling to the vehicle key, for example, big data analysis data including driving behavior analysis data or component life analysis data, or operation data including user profile data, interest and preference data, or human machine interface interaction record data.

Figure 3:
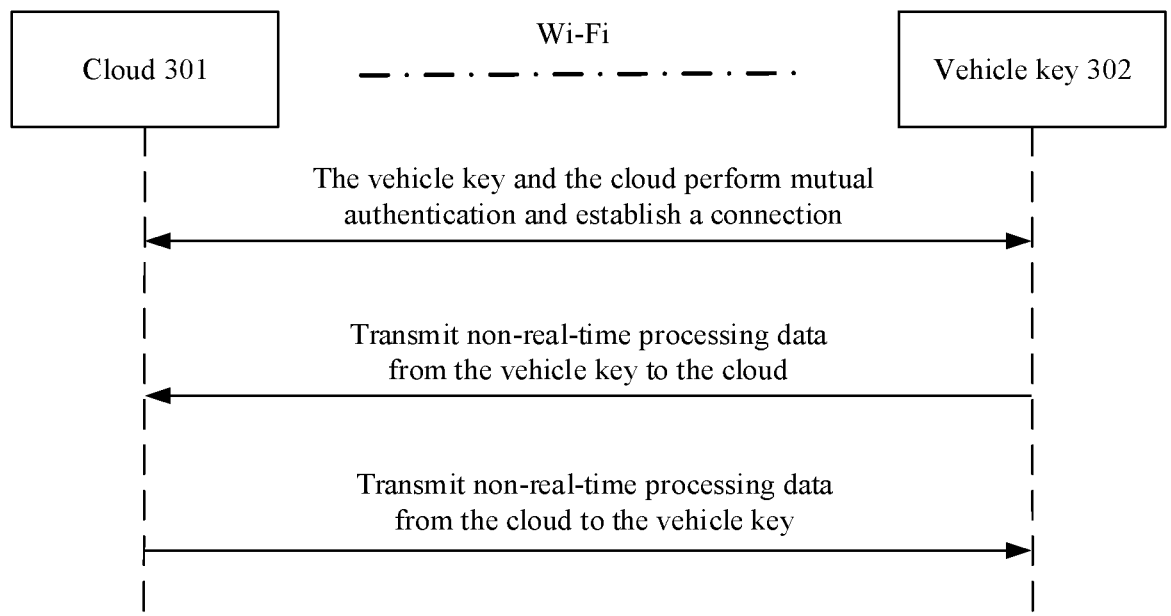
FIG. 3 is a schematic diagram of a method for storing and transmitting data between cloud and a vehicle key by using the vehicle key according to an embodiment of this application.

Embodiment 2 of this application provides a method for storing and transmitting data by using a vehicle key, and is applied to data transmission between the vehicle key and cloud. As shown in FIG. 3, after identity authentication between the vehicle key and the cloud succeeds and a connection is established, non-real-time processing data may be transmitted from the vehicle key to the cloud, or from the cloud to the vehicle key through Wi-Fi.

When traveling is finished, the vehicle key disconnects from an intelligent vehicle. When a user carries the key and enters an environment that facilitates direct communication with the cloud, for example, a wireless transmission environment (for example, a wireless network environment) or a wired transmission environment (for example, inserting into a computer USB port), the vehicle key establishes the connection to the cloud. Optionally, both identities of the vehicle key and the cloud need to be authenticated. In this case, the vehicle key is in a non-working state. Data transmission between the vehicle key and the cloud may be wireless transmission, for example, Wi-Fi transmission, Bluetooth transmission, or infrared transmission, or may be using a wired transmission transit PC. For example, the vehicle key connects, by using a USB cable or an RJ45 network cable, to a PC that is connected to the cloud. A mutual authentication manner may be a manner of using a SSL bidirectional certificate for authentication or a manner of using a username and a password, or may be another common manner or a combination of a plurality of manners.

In a possible implementation, the vehicle key functions as a data transit device. In one aspect, the vehicle key may send non-real-time processing data generated during traveling of the intelligent vehicle to the cloud, for example, big data analysis data including driving behavior analysis data or component life analysis data, or operation data including user profile data, interest and preference data, or human machine interface interaction record data. In another aspect, the vehicle key may receive and store non-real-time processing data downloaded from the cloud, for example, system upgrade data including vehicle upgrade package data or knowledge base update data. Optionally, after the vehicle key completes sending the non-real-time processing data that needs to be sent to the cloud, reception of the data sent to the cloud is confirmed, and the vehicle key receives a reception confirmation feedback from the cloud, the vehicle key clears the sent data stored in the vehicle key. A volume of the non-real-time processing data usually is large, but the non-real-time processing data does not need to be exchanged with the intelligent vehicle in real time. If an in-vehicle computer system of the intelligent vehicle that consumes mobile data is used to download the data during traveling, high costs are incurred. However, using the vehicle key as the transit device can save costs.

In another possible implementation, in one aspect, the cloud may automatically receive and store non-real-time processing data that is generated during traveling of the intelligent vehicle in the vehicle key and that is received from the intelligent vehicle, for example, big data analysis data including driving behavior analysis data or component life analysis data, or operation data including user profile data, interest and preference data, or human machine interface interaction record data. In another aspect, the cloud may send non-real-time processing data that is needed by the intelligent vehicle to the vehicle key, for example, system upgrade data including vehicle upgrade package data or knowledge base update data.

Figure 4A:
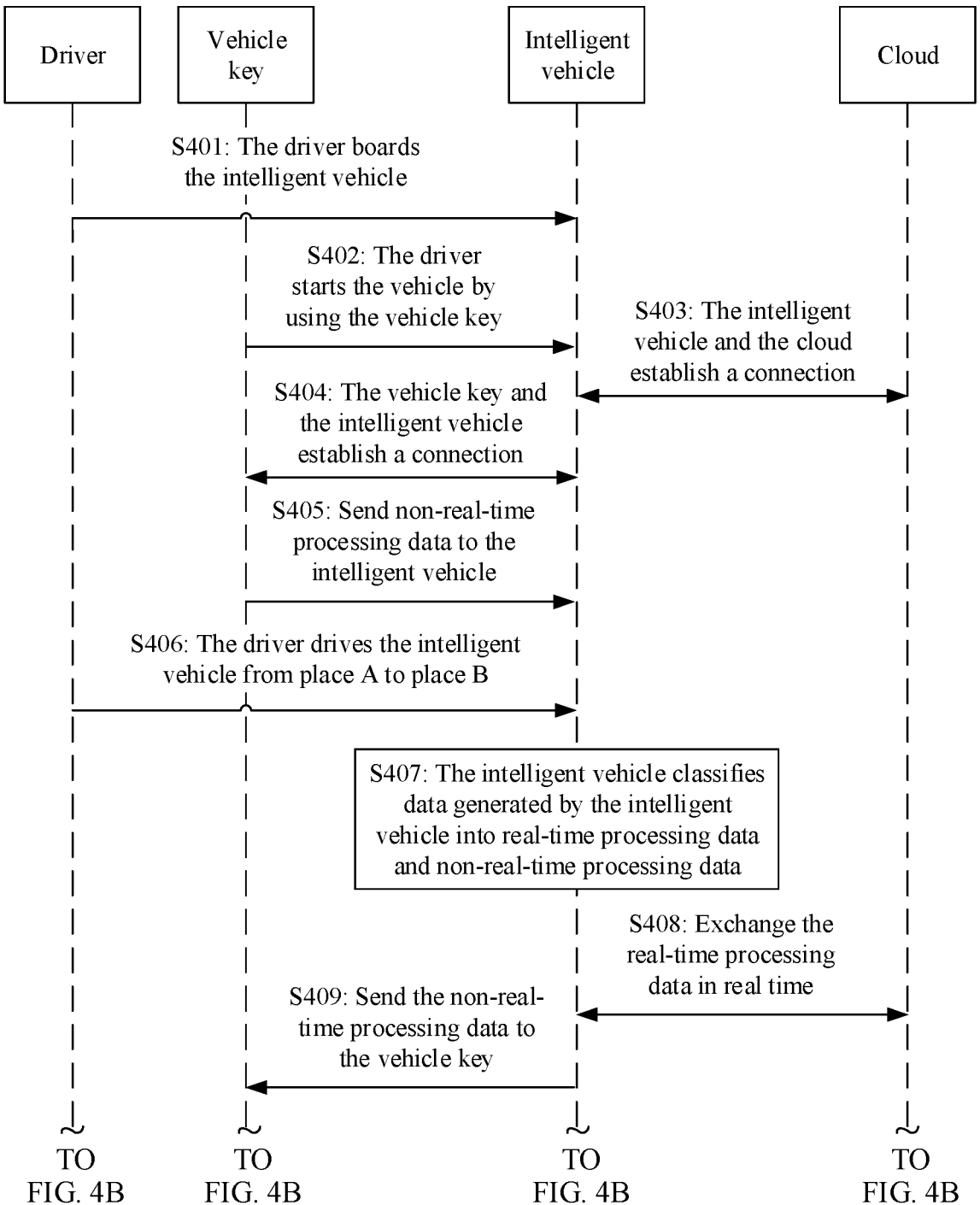
FIG. 4A and FIG. 4B are a schematic diagram of a method for storing and transmitting data between an intelligent vehicle, a vehicle key, and cloud by using the vehicle key according to an embodiment of this application.
Figure 4B:
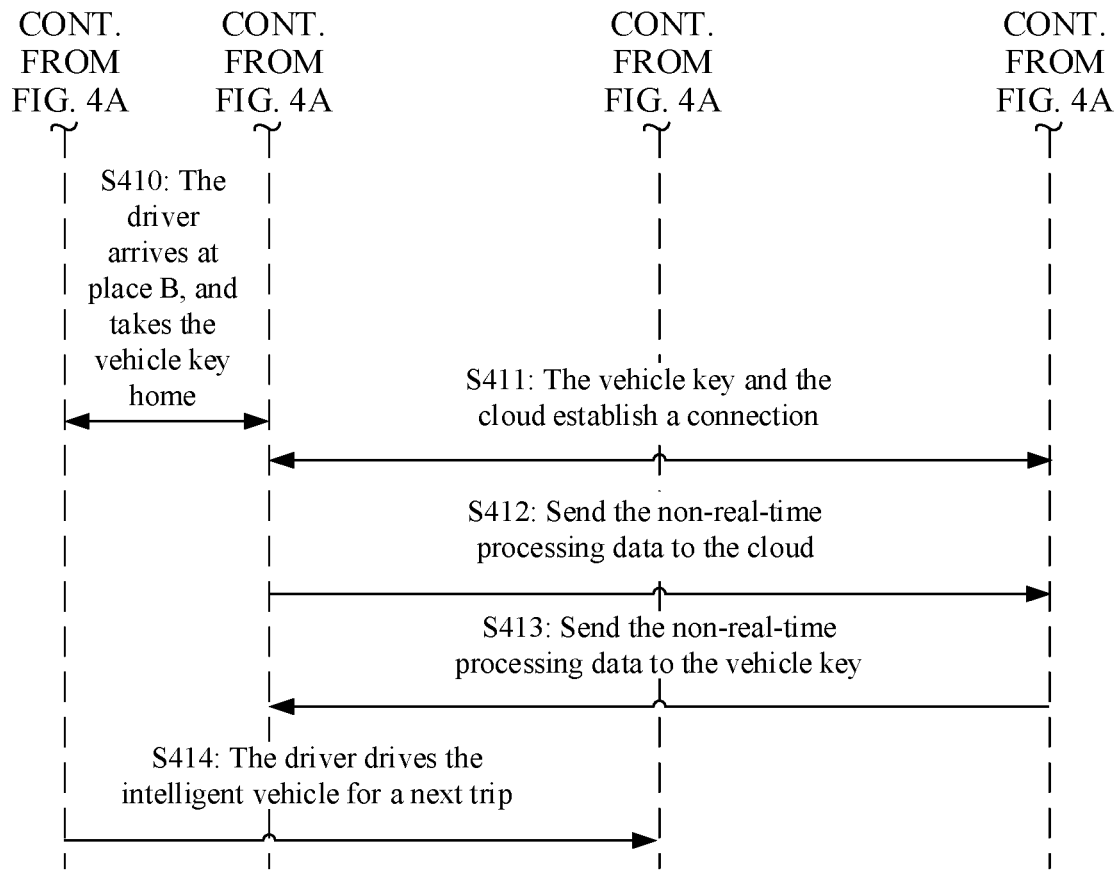

A method for storing and transmitting data by using a vehicle key and a complete data exchange process between three parties, namely an intelligent vehicle, a vehicle key, and cloud that are provided in an embodiment of this application are shown in FIG. 4A and FIG. 4B. FIG. 4A and FIG. 4B show a data exchange process of an entire driving process in which a driver drives an intelligent vehicle from place A to place B on a day. A detailed process includes the following steps.

S401: A driver boards an intelligent vehicle.

S402: The driver starts the intelligent vehicle by using a vehicle key.

S403: After the intelligent vehicle is started, the intelligent vehicle establishes a connection to cloud and performs identity authentication.

S404: The vehicle key establishes a connection to the intelligent vehicle and performs identity authentication, and the vehicle key enters a working state. Data transmission between the vehicle key and the intelligent vehicle may be wireless transmission, for example, Wi-Fi transmission, Bluetooth transmission, or infrared transmission, may be wired transmission, for example, USB cable transmission or RJ45 network cable transmission, or may be other low-cost short-distance communication data transmission, for example, NFC. A mutual authentication manner may be a manner of using a SSL bidirectional certificate for authentication or a manner of using a username and a password, or may be another common manner or a combination of a plurality of manners.

S405: The vehicle key sends stored non-real-time processing data from the cloud to the intelligent vehicle, for example, system upgrade data including vehicle upgrade package data or knowledge base upgrade data. After the sending is completed, reception of the data sent to the intelligent vehicle is confirmed. After the vehicle key receives a reception confirmation feedback from the intelligent vehicle, the vehicle key clears the sent data stored in the vehicle key. After receiving the data, the intelligent vehicle provides the data to an internal processing module for subsequent processing.

S406: The driver drives the intelligent vehicle from place A to place B.

S407: The intelligent vehicle generates data during a traveling process. The data is classified into two types by an in-vehicle data management apparatus of the intelligent vehicle: real-time processing data that needs to be uploaded to the cloud in real time, for example, real-time speed data, intelligent vehicle location data, real-time battery information data (temperature data, current data, voltage data, and the like), or fault alarm data; for example, big data analysis data including driving behavior analysis data or component life analysis data, or operation data including user profile data, interest and preference data, or human machine interface interaction record data.

S408: The intelligent vehicle sends, to the cloud, the real-time processing data that needs to be uploaded to the cloud in real time, and the cloud feeds back real-time processing data to the intelligent vehicle, that is, real-time processing data is exchanged between the intelligent vehicle and the cloud.

S409: The intelligent vehicle sends, to the vehicle key, the non-real-time processing data that does not need to be uploaded to the cloud in real time.

S410: The driver arrives at the destination place B, carries the vehicle key and gets out of the intelligent vehicle, and enters an environment in which the vehicle key is easily connected to the cloud, for example, a house covered by Wi-Fi.

S411: The vehicle key establishes a connection to the cloud and performs identity authentication, and the vehicle key enters a non-working state. Data transmission between the vehicle key and the cloud may be wireless transmission, for example, Wi-Fi transmission, Bluetooth transmission, or infrared transmission, or may be using a wired transmission transit PC. For example, the vehicle key connects, by using a USB cable or an RJ45 network cable, to a PC that is connected to the cloud. A mutual authentication manner may be a manner of using a SSL bidirectional certificate for authentication or a manner of using a username and a password, or may be another common manner or a combination of a plurality of manners.

S412: The vehicle key sends the non-real-time processing data received from the intelligent vehicle to the cloud, for example, the big data analysis data including the driving behavior analysis data or the component life analysis data, or the operation data including the user profile data, the interest and preference data, or the human machine interface interaction record data. After the sending is completed, reception of the data sent to the cloud is confirmed. After the vehicle key receives a reception confirmation feedback from the cloud, the vehicle key clears the sent data stored in the vehicle key. After receiving the data, the cloud stores and performs subsequent processing on the data.

S413: The cloud prepares the non-real-time processing data required by the intelligent vehicle that is paired with the vehicle key, for example, the system upgrade data including the vehicle upgrade package data or the knowledge base update data, and sends the data to the vehicle key. The vehicle key stores the data to its own storage module.

S414: When the driver boards the intelligent vehicle for next traveling, repeat step 1.

Figure 5:
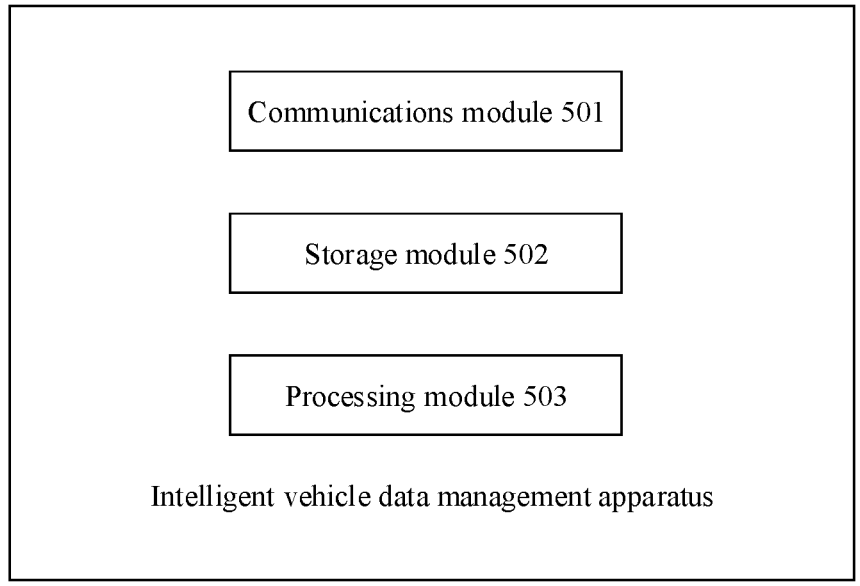
FIG. 5 is a schematic diagram of a structure of an intelligent vehicle data management apparatus according to an embodiment of this application.

Embodiment 3 of this application provides an intelligent vehicle data management apparatus. The intelligent vehicle data management apparatus is shown in FIG. 5. The intelligent vehicle data management apparatus includes a communications module 501, a storage module 502, and a processing module 503. The communications module 501 is configured to separately establish a connection to a vehicle key or cloud, and receive and send data. The intelligent vehicle data management apparatus may establish the connection to the vehicle key through wireless transmission, for example, Wi-Fi transmission, Bluetooth transmission, or infrared transmission, or through wired transmission, for example, USB cable transmission or RJ45 network cable transmission, or through other low-cost short-distance communication data transmission, for example, near field communication NFC. The intelligent vehicle data management apparatus may establish the connection to the cloud in a common manner, for example, by using a mobile cellular network. The intelligent vehicle data management apparatus may be configured to receive and send data. Specifically, the intelligent vehicle data management apparatus receives, from the vehicle key, non-real-time processing data downloaded from the cloud, for example, system upgrade data including vehicle upgrade package data or knowledge base update data; sends non-real-time processing data generated by the intelligent vehicle to the cloud, for example, big data analysis data including driving behavior analysis data or component life analysis data, and operation data including user profile data, interest and preference data, or human machine interface interaction record data; receives real-time processing data from the cloud, for example, CP data or SP data invoked by the cloud; or sends real-time processing data generated by the intelligent vehicle to the cloud, for example, real-time speed data, intelligent vehicle location data, real-time battery information data (temperature data, current data, voltage data, and the like), or fault alarm data.

The storage module 502 is configured to store the received non-real-time processing data from the vehicle key, for example, the system upgrade data including the vehicle upgrade package data or the knowledge base update data, or store the received real-time processing data from the cloud, for example, the CP data or the SP data invoked by the cloud.

The processing module 503 is configured to classify data generated in a running process of the intelligent vehicle into the real-time-processing data that needs to be uploaded to the cloud in real time and the non-real-time processing data that does not need to be uploaded to the cloud in real time. The processing module 503 is further configured to separately provide the received data from the vehicle key to each related module inside the intelligent vehicle. For example, after receiving the vehicle upgrade package data used to upgrade the vehicle, the processing module 503 of the intelligent vehicle data management apparatus provides the data to an intelligent vehicle upgrade apparatus. After receiving the knowledge base update data used to update a knowledge base, the processing module 503 of the intelligent vehicle data management apparatus provides the knowledge base update data to an intelligent vehicle knowledge base apparatus. Optionally, the processing module 503 is further configured to separately perform identity authentication with the vehicle key and the cloud. A manner of the identity authentication may be a manner of using a SSL bidirectional certificate for authentication or a manner of using a username and a password, or may be another common manner or a combination of a plurality of manners.

Figure 6:
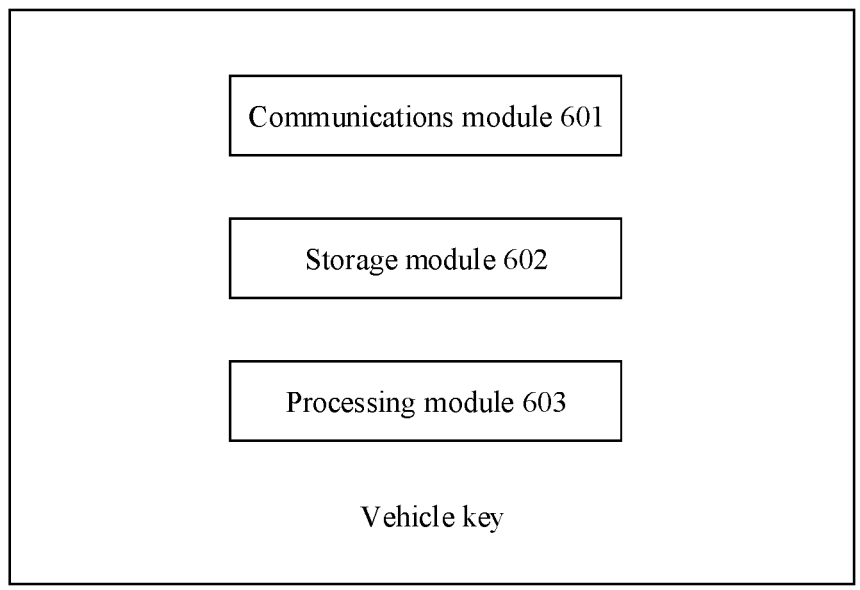
FIG. 6 is a schematic diagram of a structure of a vehicle key according to an embodiment of this application.

Embodiment 4 of this application provides a vehicle key. As shown in FIG. 6, FIG. 6 is a schematic diagram of a structure of the vehicle key. The vehicle key includes a communications module 601, a storage module 602, and a processing module 603. The communications module 601 is configured to separately establish connections to an intelligent vehicle and cloud, and receive and send data. Data transmission between the vehicle key and the intelligent vehicle may be wireless transmission, for example, wireless fidelity (Wi-Fi) transmission, Bluetooth transmission, or infrared transmission, or may be wired transmission, for example, USB cable transmission or RJ45 network cable transmission. Further, communication may be performed through other low-cost short-distance communication data transmission, for example, NFC. Data transmission between the vehicle key and the cloud may be wireless transmission, for example, Wi-Fi transmission, Bluetooth transmission, or infrared transmission, or may be using a wired transmission transit personal computer (PC). For example, the vehicle key connects, by using a USB cable or an RJ45 network cable, to a PC that is connected to the cloud. The vehicle key may be configured to receive and send data, specifically, receive non-real-time processing data from the intelligent vehicle and send the non-real-time processing data to the cloud, for example, big data analysis data including driving behavior analysis data or component life analysis data, and operation data including user profile data, interest and preference data, or human machine interface interaction record data; or receive non-real-time processing data from the cloud and send the non-real-time processing data to the intelligent vehicle, for example, system upgrade data including vehicle upgrade package data or knowledge base update data.

The storage module 602 is configured to store the received non-real-time processing data from the intelligent vehicle, for example, the big data analysis data including the driving behavior analysis data or the component life analysis data, or the operation data including the user profile data, the interest and preference data, or the human machine interface interaction record data; or store the received non-real-time processing data from the cloud for example, the system upgrade data including the vehicle upgrade package data or the knowledge base update data.

The processing module 603 is configured to determine whether the vehicle key is in a working state or a non-working state. The working state is that the vehicle key is connected to the intelligent vehicle, and the non-working state is that the vehicle key is connected to the cloud. Optionally, the processing module 603 is further configured to separately perform identity authentication with the intelligent vehicle and the cloud, where the connection is established only after the identity authentication succeeds. A manner of the identity authentication may be a manner of using a SSL bidirectional certificate for authentication or a manner of using a username and a password, or may be another common manner or a combination of a plurality of manners.

After the processing module 603 determines that the vehicle key is in the working state and unified identity authentication between the vehicle key and the intelligent vehicle succeeds, the communications module 601 of the vehicle key receives the data from the intelligent vehicle and stores the data from the intelligent vehicle into the storage module 602, or sends the data from the cloud stored in the storage module 602 to the intelligent vehicle. The working state is that the vehicle key is connected to the intelligent vehicle. After the processing module 603 determines that the vehicle key is in the non-working state and unified identity authentication between the vehicle key and the cloud succeeds, the communications module 601 of the vehicle key receives the data from the cloud and stores the data from the cloud in the storage module 602, or sends the data from the intelligent vehicle stored in the storage module 602 to the cloud. The non-working state is that the vehicle key is not connected to the intelligent vehicle. Optionally, after reception of the data sent by the vehicle key to the intelligent vehicle is confirmed, or reception of the data sent by the vehicle key to the cloud is confirmed, and the wireless communications module 601 receives reception confirmation feedback information from the intelligent vehicle or the cloud, the processing module 603 may be further configured to clear the sent data stored in the storage module, to ensure that there is sufficient space for storing data to be received.

Embodiment 5 of this application provides an intelligent vehicle, where the intelligent vehicle includes the intelligent vehicle data management apparatus according to Embodiment 3 and the vehicle key according to Embodiment 4. Details are not described herein again.

Figure 7:
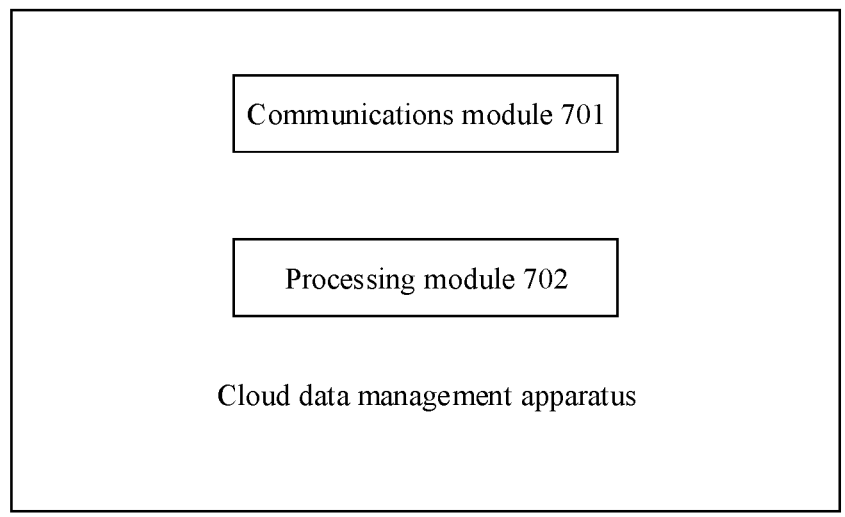
FIG. 7 is a schematic diagram of a structure of a cloud data management apparatus according to an embodiment of this application.

Embodiment 6 of this application provides a cloud data management apparatus. The cloud data management apparatus is shown in FIG. 7. The cloud data management apparatus includes a communications module 701 and a processing module 702. The communications module 701 is configured to separately establish connections to a vehicle key and an intelligent vehicle, and receive and send data. Data transmission between the cloud data management apparatus and the vehicle key may be wireless transmission, for example, wireless fidelity (Wi-Fi) transmission, Bluetooth transmission, or infrared transmission, or may be using a wired transmission transit personal computer (PC). For example, the vehicle key connects, by using a USB cable or an RJ45 network cable, to a PC that is connected to the cloud. The cloud data management apparatus may establish the connection to the intelligent vehicle in a common manner, for example, by using a mobile cellular network. The cloud data management apparatus may be configured to receive and send data, specifically, receive, from the vehicle key, non-real-time processing data received from the intelligent vehicle, for example, big data analysis data including driving behavior analysis data or component life analysis data, and operation data including user profile data, interest and preference data, or human machine interface interaction record data; send non-real-time processing data that is required by the intelligent vehicle and stored in the cloud to the intelligent vehicle, for example, system upgrade data including vehicle upgrade package data or knowledge base update data; receive real-time processing data from the intelligent vehicle, for example, real-time speed data, intelligent vehicle location data, real-time battery information data (temperature data, current data, voltage data, and the like), or fault alarm data; or send real-time processing data required by the intelligent vehicle to the intelligent vehicle, for example, CP data or SP data invoked by the cloud.

The processing module 702 is configured to filter out the data that is required by the intelligent vehicle and stored in the cloud, and send the data to the intelligent vehicle key, for example, the system upgrade data including the vehicle upgrade package data or the knowledge base update data. The processing module 702 is further configured to perform classification and storage, and subsequent processing on the non-real-time processing data that is from the intelligent vehicle and that is received from the intelligent vehicle key, for example, the big data analysis data including the driving behavior analysis data or the component life analysis data, and the operation data including the user profile data, the interest and preference data, or the human machine interface interaction record data. Optionally, the processing module 702 is further configured to separately perform identity authentication with the intelligent vehicle and the vehicle key. A manner of the identity authentication may be a manner of using a SSL bidirectional certificate for authentication or a manner of using a username and a password, or may be another common manner or a combination of a plurality of manners.

It should be noted that the intelligent vehicle data management apparatus or the cloud data management apparatus in embodiments of this application may be implemented by using a hardware circuit, or may be implemented by using software. When the intelligent vehicle data management apparatus or the cloud data management apparatus is implemented by using software, the intelligent vehicle data management apparatus or the cloud data management apparatus implements a function of one (or more) module (or component) by running program instructions.

It should be further noted that a processor of the intelligent vehicle data management apparatus or the cloud data management apparatus in embodiments of this application may be a central processing unit, a general-purpose processor, a digital signal processor, an application-specific integrated circuit, a programmable gate array or another programmable logic device, a transistor logic device, a hardware component, or any combination thereof. The processor may implement or execute various example logical blocks, modules, or circuits described with reference to content disclosed in this application. Alternatively, the processor may be a combination of processors implementing a computing function, for example, a combination of one or more microprocessors, or a combination of the digital signal processor and a microprocessor.

The storage module of the intelligent vehicle data management apparatus, the vehicle key, or the cloud data management apparatus in this embodiment of this application may include any medium that can store data, for example, a read-only memory (ROM), a random access memory (RAM), a magnetic disk, or an optical disc.

The foregoing descriptions are merely example embodiments of this application, but are not intended to limit this application in any form. Although the example embodiments of this application are disclosed above, these examples are not intended to limit this application. By using the principles disclosed above, any person of ordinary skill in the art can make a plurality of possible changes and modifications to the disclosed technical solutions of this application, or amend the disclosed technical solutions to be embodiments with equal effects through equivalent variations without departing from the principles of the disclosed technical solutions of this application. Therefore, amendments, equivalent variations, and modifications made relative to the disclosed embodiments may fall within the protection scope of this application.

What is claimed is:

1. A method for storing and transmitting data by using a vehicle key, the method comprising:
receiving, by the vehicle key while the vehicle key is in a first state in which the vehicle key has an established connection to an intelligent vehicle, first data from the intelligent vehicle, wherein the first data is data that has been classified by the intelligent vehicle as non-real-time processing data, wherein the first data comprises driving behavior analysis data, component life analysis data, user profile data, interest and preference data, and human machine interface interaction record data, and wherein the intelligent vehicle is configured for communicating data classified by the intelligent vehicle as real-time processing data directly with a cloud in real-time via a cellular network, wherein the real-time processing data includes real-time speed data, intelligent vehicle location data, real-time battery information data, fault alarm data, and speech instruction data, wherein the real-time battery information data includes temperature data, current data and voltage data;
storing, by the vehicle key, the first data;
automatically wirelessly accessing, by the vehicle key, an authenticated network environment via a wireless communications interface of the vehicle key without user intervention;
in response to wirelessly accessing the authenticated network environment, automatically sending, by the vehicle key while the vehicle key is in a second state in which the vehicle key has an established connection to the cloud, the first data to the cloud without user intervention;
receiving, by the vehicle key while the vehicle key is in the second state, second data from the cloud, wherein the second data is non-real-time processing data from the cloud comprising system upgrade data, wherein the system upgrade data comprises vehicle upgrade package data or knowledge base update data;
storing, by the vehicle key, the second data;
sending, by the vehicle key while the vehicle key is in the first state, the second data to the intelligent vehicle;
receiving, by the vehicle key, a first data reception confirmation from the intelligent vehicle or a second data reception confirmation from the cloud; and
after receiving the first data reception confirmation from the intelligent vehicle or second data reception confirmation from the cloud, clearing, by the vehicle key, the stored second data from the vehicle key;
wherein the method further comprises:
separately performing, by the vehicle key, identity authentication with the intelligent vehicle and with the cloud by using one or more secure sockets layer (SSL) bidirectional certificates for authentication and/or one or more usernames and passwords, wherein the identity authentication with the intelligent vehicle includes authenticating both an identity of the vehicle key and an identity of the intelligent vehicle;
and establishing, by the vehicle key, the connection to the intelligent vehicle and the connection to the cloud based on the identity authentications succeeding;
wherein the vehicle key is configured to open and close doors of the intelligent vehicle and to start the intelligent vehicle.

2. The method according to claim 1, wherein the vehicle key receives the first data from the intelligent vehicle or sends the second data to the intelligent vehicle through wireless transmission, wired transmission, or short-distance transmission.

3. A vehicle key, wherein the vehicle key comprises:
a transceiver configured to:
receive, while the vehicle key is in a first state in which the vehicle key has an established connection to an intelligent vehicle, first data from the intelligent vehicle, wherein the first data is data that has been classified by the intelligent vehicle as non-real-time processing data, wherein the first data comprises driving behavior analysis data, component life analysis data, user profile data, interest and preference data, and human machine interface interaction record data, and wherein the intelligent vehicle is configured for communicating data classified by the intelligent vehicle as real-time processing data directly with a cloud in real-time via a cellular network, wherein the real-time processing data includes real-time speed data, intelligent vehicle location data, real-time battery information data, fault alarm data, and speech instruction data, wherein the real-time battery information data includes temperature data, current data and voltage data; and
automatically receive, while the vehicle key is in a second state in which the vehicle key has an established connection to the cloud, second data from the cloud without user intervention, wherein the second data is non-real-time processing data from the cloud comprising system upgrade data, wherein the system upgrade data comprises vehicle upgrade package data or knowledge base update data;
and a memory configured to:
store the first data received from the intelligent vehicle; and
store the second data received from the cloud;
wherein the transceiver is further configured to:
automatically wirelessly access an authenticated network environment without user intervention;
in response to wirelessly accessing the authenticated network environment, automatically send, while the vehicle key is in the second state, the first data to the cloud without user intervention; and send, while the vehicle key is in the first state, the second data to the intelligent vehicle;
wherein the vehicle key further comprises a processor configured to:
determine that, based on the vehicle key being in the first state, the vehicle key is to receive and store the first data or send the second data to the intelligent vehicle; and
determine that, based on the vehicle key being in the second state, the vehicle key is to receive and store the second data or send the first data to the cloud; and
after reception of the second data sent by the vehicle key to the intelligent vehicle is confirmed or after reception of the first data sent by the vehicle key to the cloud is confirmed, clear the sent second data or the sent first data from the memory;
wherein the processor is further configured to:
separately perform identity authentication with the intelligent vehicle and with the cloud by using one or more secure sockets layer (SSL) bidirectional certificates for authentication and/or one or more usernames and passwords, wherein the identity authentication with the intelligent vehicle includes authenticating both an identity of the vehicle key and an identity of the intelligent vehicle; and cause the connection to the intelligent vehicle and the connection to the cloud to be established based on the identity authentications succeeding;
wherein the vehicle key is further configured to open and close doors of the intelligent vehicle and to start the intelligent vehicle.

4. The vehicle key according to claim 3, wherein the transceiver is configured to receive the first data from the intelligent vehicle and send the second data to the intelligent vehicle through wireless transmission, wired transmission, or short-distance transmission.

5. The vehicle key according to claim 4, wherein the wireless transmission comprises wireless fidelity (Wi-Fi) transmission, Bluetooth transmission, or infrared transmission;
wherein the wired transmission comprises Universal Serial Bus (USB) cable transmission or RJ45 network cable transmission; or
wherein the short-distance transmission comprises near field communication (NFC).

6. A non-transitory computer-readable medium having instructions stored thereon for storing and transmitting data by using a vehicle key, wherein the instructions, when executed by one or more processors, facilitate performance of the following:

receiving, by the vehicle key while the vehicle key is in a first state in which the vehicle key has an established connection to an intelligent vehicle, first data from the intelligent vehicle, wherein the first data is data that has been classified by the intelligent vehicle as non-real-time processing data, wherein the first data comprises driving behavior analysis data, component life analysis data, user profile data, interest and preference data, and human machine interface interaction record data, and wherein the intelligent vehicle is configured for communicating data classified by the intelligent vehicle as real-time processing data directly with a cloud in real-time via a cellular network, wherein the real-time processing data includes real-time speed data, intelligent vehicle location data, real-time battery information data, fault alarm data, and speech instruction data, wherein the real-time battery information data includes temperature data, current data and voltage data;

storing, by the vehicle key, the first data;

automatically wirelessly accessing, by the vehicle key, an authenticated network environment via a wireless communications interface of the vehicle key without user intervention;

in response to wirelessly accessing the authenticated network environment, automatically sending, by the vehicle key while the vehicle key is in a second state in which the vehicle key has an established connection to the cloud, the first data to the cloud without user intervention;

automatically receiving, by the vehicle key while the vehicle key is in the second state, second data from the cloud without user intervention, wherein the second data is non-real-time processing data from the cloud comprising system upgrade data, wherein the system upgrade data comprises vehicle upgrade package data or knowledge base update data;

storing, by the vehicle key, the second data;

sending, by the vehicle key while the vehicle key is in the first state, the second data to the intelligent vehicle;

receiving, by the vehicle key, a first data reception confirmation from the intelligent vehicle or a second data reception confirmation from the cloud; and after receiving the first data reception confirmation from the intelligent vehicle or second data reception confirmation from the cloud, clearing, by the vehicle key, the stored second data from the vehicle key;

wherein the instructions, when executed by the one or more processors, further facilitate:

separately performing, by the vehicle key, identity authentication with the intelligent vehicle and with the cloud by using one or more secure sockets layer (SSL) bidirectional certificates for authentication and/or one or more usernames and passwords, wherein the identity authentication with the intelligent vehicle includes authenticating both an identity of the vehicle key and an identity of the intelligent vehicle;

and establishing, by the vehicle key, the connection to the intelligent vehicle and the connection to the cloud based on the identity authentications succeeding;

wherein the vehicle key is further configured to open and close doors of the intelligent vehicle and to start the intelligent vehicle.

7. The non-transitory computer-readable medium according to claim 6, wherein the vehicle key receives the first data from the intelligent vehicle or sends the second data to the intelligent vehicle through wireless transmission, wired transmission, or short-distance transmission.

* * * * *